(12) United States Patent
Jacobson et al.

(10) Patent No.: US 7,128,230 B2
(45) Date of Patent: Oct. 31, 2006

(54) BEVERAGE DECANTER ADAPTER AND LID

(75) Inventors: Jody G. Jacobson, St. Charles, MO (US); David L. Brandsma, St. Charles, MO (US); Joseph P. Webster, St. Charles, MO (US)

(73) Assignee: Newco Enterprises Inc., St. Charles, MO (US)

( * ) Notice: Subject to any disclaimer, the term of this patent is extended or adjusted under 35 U.S.C. 154(b) by 1 day.

(21) Appl. No.: 10/965,364

(22) Filed: Oct. 14, 2004

(65) Prior Publication Data

US 2005/0139504 A1  Jun. 30, 2005

Related U.S. Application Data

(60) Provisional application No. 60/512,560, filed on Oct. 16, 2003.

(51) Int. Cl.
*B65D 6/28* (2006.01)

(52) U.S. Cl. .................. 220/4.26; 220/4.27; 220/781; 206/508; 206/509

(58) Field of Classification Search ............... 220/4.26, 220/4.27, 781, 802, 380, 254.4, 820, 375, 220/821, 823, 824; 206/508, 509; D9/456
See application file for complete search history.

(56) References Cited

U.S. PATENT DOCUMENTS

| | | | | |
|---|---|---|---|---|
| 282,585 | A * | 8/1883 | Swab ..................... 220/569 |
| 1,286,603 | A * | 12/1918 | Hahn ....................... 220/254.4 |
| 1,757,192 | A * | 5/1930 | Hothersall ................. 206/503 |
| 2,605,013 | A * | 7/1952 | Rubenstein ................ 220/554 |
| 2,957,601 | A * | 10/1960 | Novick ..................... 206/503 |
| 3,237,802 | A * | 3/1966 | Wagner .................... 206/508 |
| 4,296,871 | A * | 10/1981 | Andersson ................ 220/781 |
| 4,520,940 | A * | 6/1985 | Boyd et al. ............... 220/375 |
| 4,593,818 | A * | 6/1986 | Schenkman .............. 206/503 |
| 4,595,099 | A * | 6/1986 | Zaruba et al. ............ 206/525 |
| 5,125,538 | A * | 6/1992 | Morris, Sr. ................ 222/143 |
| 5,297,681 | A * | 3/1994 | Gourley .................... 206/503 |
| 5,775,483 | A * | 7/1998 | Lown et al. ............... 206/508 |
| 5,984,127 | A * | 11/1999 | Fenton .................... 220/254.1 |
| 6,199,699 | B1 * | 3/2001 | Eastman ................... 206/545 |

* cited by examiner

*Primary Examiner*—Stephen Castellano
*Assistant Examiner*—Eugene Lhymn
(74) *Attorney, Agent, or Firm*—Paul M. Denk

(57) ABSTRACT

An adapter for use with at least a pair of dispensers, to provide for convenient stacking of a plurality of dispensers one upon the other, one of such adapters being arranged intermediate each pair of vertically stacked decanters, during usage. The adapter includes a series of ribs and flanges, that provide convenient seating and stable support for a variety of the decanters when stacked one upon the other. The adapter includes an aperture approximately centered thereof, through which a beverage may be brewed, into the decanter arranged therebelow, and the adapter being applied to a beverage brewer during usage, as during a beverage brewing cycle. The cap provides for closure of the adapter aperture, to provide the adapter with the attributes of a lid, and to help retain the warmth of any beverage contained within its dispenser upon which the adapter is applied.

4 Claims, 3 Drawing Sheets

BEVERAGE DECANTER ADAPTER AND LID

CROSS REFERENCE TO RELATED APPLICATION

This non-provisional patent application claims priority to the provisional patent application having Ser. No. 60/512,560, which was filed on Oct. 16, 2003.

BACKGROUND OF THE INVENTION

This invention relates generally to means for providing an adapter between stackable decanters, the type that are used to hold brewed beverages, in the category of coffee, tea, and related drinks.

Various types of decanters have long been available in the prior art. All of these are for use for holding beverages, particularly those that are freshly brewed, and which they further include other attributes such as providing for insulation, such as the thermos, for holding and sustaining a heated beverage, or a cooled beverage, for subsequent dispensing and consumption. In addition, some of these vessels or decanters are of a fairly large size, and include their own spigot, at the bottom, that allows for the dispensing of any beverage maintained therein, during usage. Some of these decanters, even though they may be of substantial size, perhaps in the two to four gallon capacity, may yet be used in conjunction with the beverage brewing apparatus, whether it be for the preparation of hot tea or coffee, or other beverages, directly under a brew basket or other brewing apparatus, the beverage as brewed being deposited directly into the decanter, of substantial volume, for eventual dispensing and consumption. Having a variety of these types of decanters, provided around a counter or shelf, as in a commercial establishment or restaurant, or even in an office, can take up a fair amount of counter space. Hence, usage of a type of adapter, that can be applied in conjunction with such dispensers, to provide for their vertical stacking, one upon the other, is an enhancement that is needed as a desirable contribution to the field of beverage brewing and serving, for the various types of facilities, as enumerated above.

SUMMARY OF THE INVENTION

This invention generally defines the usage of a pair or more of decanters of substantial size, although decanters of various sizes may be utilized with this invention. It includes the adaptation of an adapter means, for application between various decanters, that allows for stacking of the decanters, one upon the other, and compactly and structurally held in position, so that the decanters can be used for dispensing of a variety beverages, from a single vertically stacked series of decanters, or vessels, each of which incorporates its own spigot, as at their bottoms, applicable through the usage of the various adapters that are applied between each pair of stacked decanters, during application and usage.

The adapter of this invention includes a lid-like structure, which, on its bottom surface, includes a pair of downwardly extending ribs, intermediate thereof having sufficient space to provide for resting of the adapter on to the upper edge of a decanter arranged therebelow, while the upper surface of the adapter includes an upstanding perimeter flange, around its periphery, and into which a decanter thereabove can be located and rested, for use for stacking of a variety of such decanters, one upon the other, each vertically aligned pair of vessels having one of the adapters of this invention arranged intermediate thereof.

Each adapter further includes an aperture through its center, with an upstanding sleeve, and provides an opening through which a beverage may be drip brewed from a brew basket, of a beverage brewer, directly into the decanter, to provide for continuous brewing of such beverages, through such an adapter, into the decanter, with the adapter providing for a type of lid resting on the decanter, so as to sustain and maintain the generated heat, of the brewed beverage, as it enters into and is stored within the decanter, in preparation for usage.

Each of the adapters, around their perimeter incorporate an upstanding flange, which includes a series of cutouts, or slots, that allow for ventilation through the side edges of the adapter, during usage, so as to vent any steam or moisture that is generated therein, due to the presence of various heated beverages, such as contained in the dispenser below, and as located within the decanter above, during usage. The decanters of this invention may be stacked one upon the other, and the elevation of their stacking will be limited only by the space available, as upon a counter, or a shelf, and the physical ability of the user to reach up, for dispensing of a beverage from a top located decanter. For example, the occupation of only a single diameter of a dispenser, arranged at the lowest location within a series of vertically stacked decanters, is all the horizontal space that will be needed to provide for stacking a variety of decanters, one upon the other, during usage. For example, the lowest decanter may include an abundant supply of freshly brewed coffee. The second decanter may include a supply of freshly brewed hot tea. The third decanter, in the stack, may include an abundant supply of freshly brewed decaf coffee. Finally, an upper decanter, or others, may include hot chocolate or other brewed beverage. All of these various beverages, within the decanters, having the adapters maintained intermediate thereof, can be stacked one upon the other, and dispensed from a single column, during usage.

This is, therefore, the principal object of this invention to provide an adapter for use with similar sized decanters or containers, for holding freshly brewed beverages, allowing for the stacking of a variety of these decanters one atop the other for usage and application of dispensing of a variety of beverages, during application.

Another object of this invention is to provide an adapter having a series of ribs and flanges substantially around its perimeter, for the purpose of providing for the seating of the adapters upon their various decanters as at their upper edges or rims, and allowing for the resting of another decanter thereon, during stacking.

Still another object of this invention to provide an adapter for use upon a substantial sized decanter, having an integral sleeve provided at its approximate midpoint, with an aperture therethrough, that allows for brewing of beverages from a beverage brewer directly into the decanter, during its usage.

Another object of this invention is to provide an adapter which may be closed, to assure the maintenance and retention of heat within any freshly brewed beverage contained within its decanter, upon which the adapter rests.

Still another object of this invention to provide an adapter that may be formed into a lid, to provide closure for the decanter upon which it rests.

Another object of this invention is to provide an adapter which incorporates ventilating means, to provide for dissipation of any moisture generated as a result of condensation, due to the presence of a hot beverage within any decanter arranged therebelow upon which the adapter rests, or the heat or coolness generated from the decanter stacked there above, which also may contain a substantially heated or cooled beverage.

These and other objects may become more apparent to those skilled in the art upon review of the summary of the invention as provided herein, and upon undertaking a study of the description of the preferred embodiment in view of the drawings.

BRIEF DESCRIPTION OF THE DRAWINGS

In referring to the drawings.

Corresponding reference numerals will be used throughout the several figures of the drawings.

DESCRIPTION OF THE PREFERRED EMBODIMENT

Figures 1, 2:
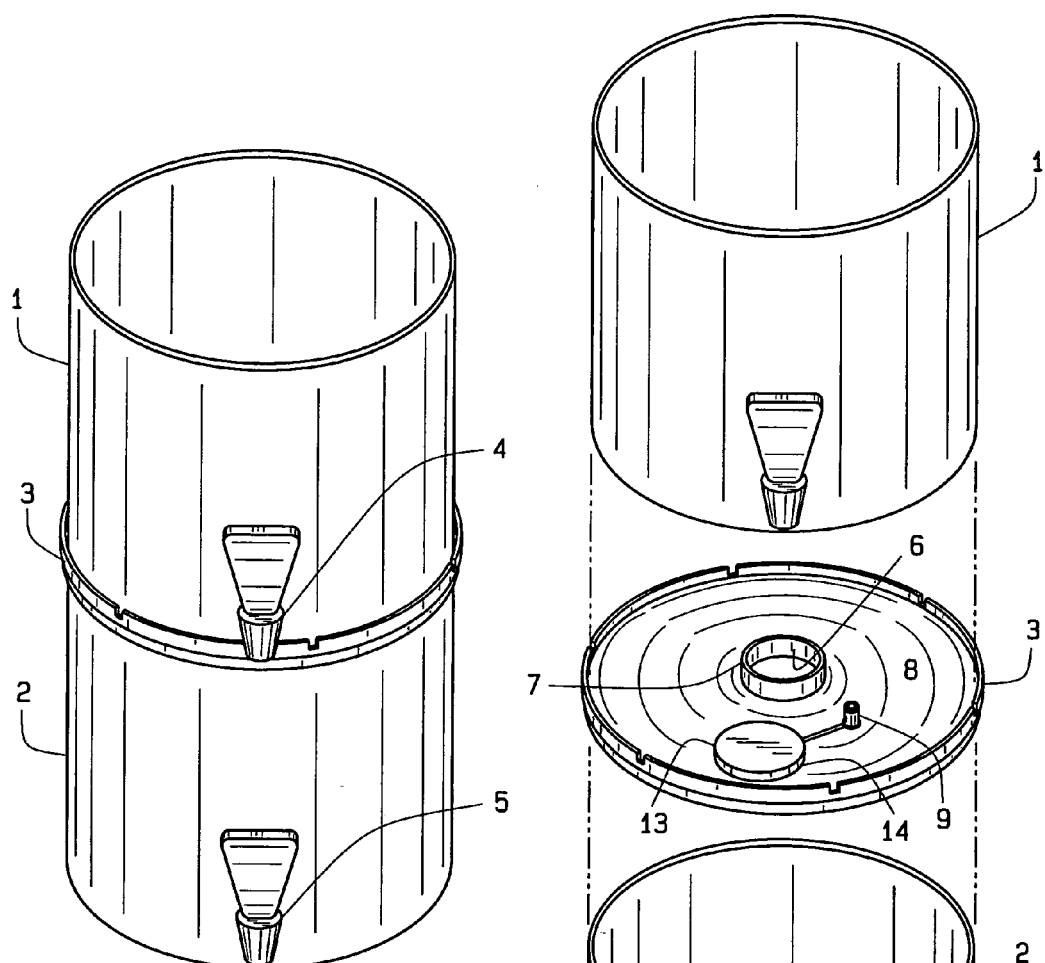
FIG. 1 shows a pair of the decanters of this invention having the adapter arranged intermediate thereof during vertical stacking.
FIG. 2 shows an exploded view of the pair of decanters, and the adapter, of FIG. 1.

In referring to FIG. 1 of the drawings, the concept of this invention is readily disclosed. It includes, as depicted therein, a pair of vessels or decanters as shown at 1 and 2, having the adapter 3 of this invention arranged intermediate thereof, to facilitate their stacking. Each of the dispensers has a spigot 4 and 5, respectively, approximate their lower edges, and which allows for the dispensing of beverages from the individual decanters, during usage.

FIG. 2 shows an exploded view of the dispensers and adapter as shown in FIG. 1. As can be noted, adapter 3 includes centrally thereof, an upstanding sleeve, as at 6 integrally formed therewith, having an aperture 7 provided therethrough, and through which the beverage may be dripped, as from a basket of a beverage brewer, into a decanter therebelow, when the adapter is applied onto the upper edge of a decanter, such as the decanter 2 as shown, and placed under a brewer, for brewing of a beverage therein. Each adapter has an integral plate as at 8, which has the sleeve 6 extending upwardly therefrom. Or, it is just as likely that the sleeve may extend downwardly, to allow for brewing of a beverage therethrough.

Figure 3:
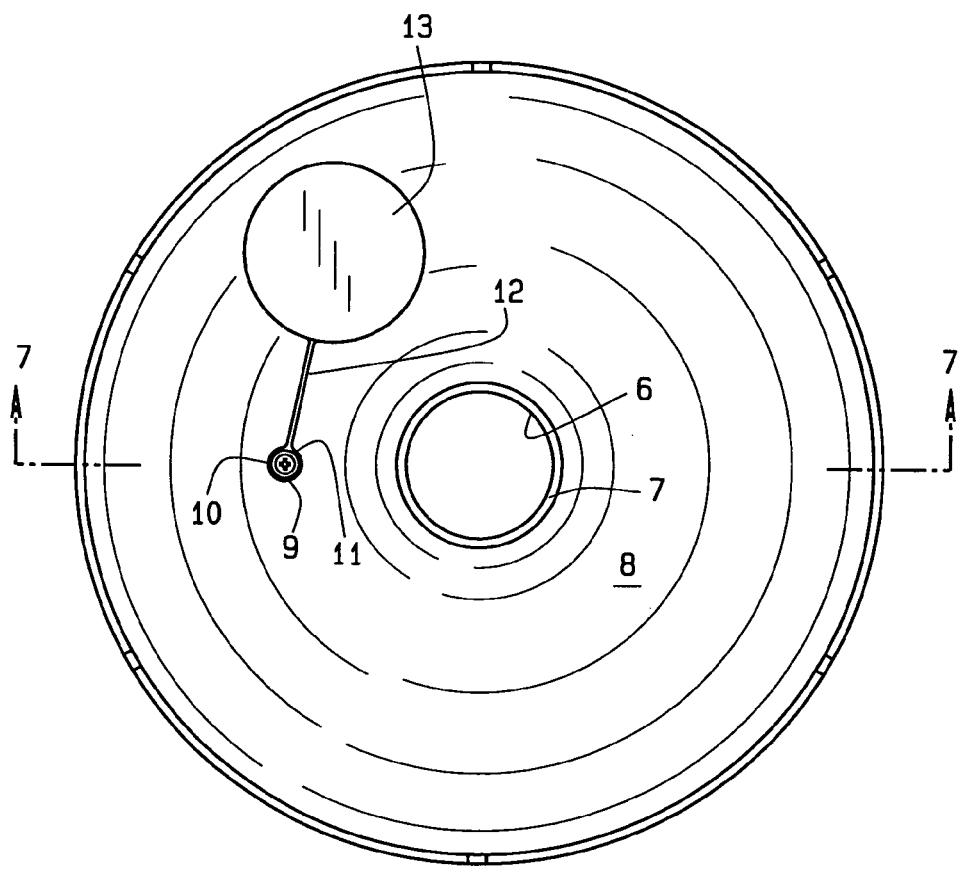
FIG. 3 provides a top plan view of the adapter shown in FIG. 2.

Also provided upon the upper surface of the plate 8 of each adapter 3 is an integral boss, as at 9. As can also be noted in FIG. 3, the boss 9 includes or receives a circular clamp 10, which links with a length of connecter 12, for connection to a cap 13, the entire unit being held in place onto the boss 9 through the usage of a threaded fastener, as noted at 11. The cap is provided for resting upon the sleeve 6, to close it off, when sufficient beverage has been brewed into the decanter therebelow, and upon which the adapter fits, in order to preserve its heat, and retain the same until the beverage is dispensed, during consumption. As can be noted, the cap 13 has a downwardly extending lip, as at 14 for resting directly onto the sleeve 6 during usage.

Figure 5:
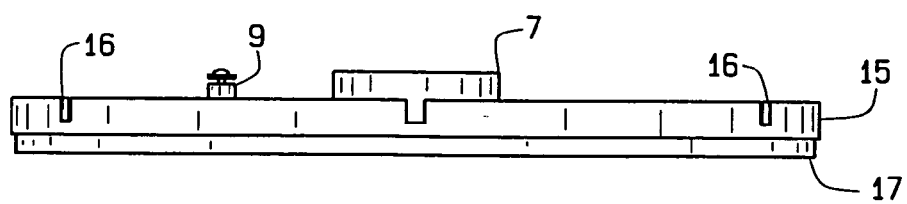
FIG. 5 is a front view of the adapter of FIG. 2.
Figure 6:
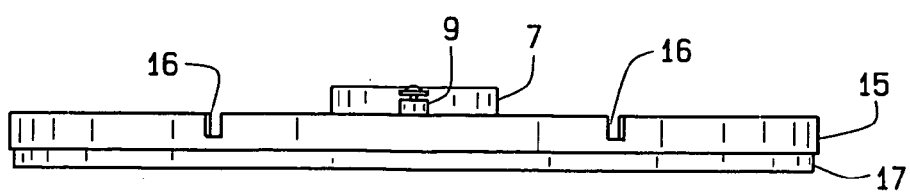
FIG. 6 is a side view of the adapter of FIG. 2.

The physical construction of the integrally formed adapter 3 can be seen more specifically in FIGS. 5 and 6. The plate 8 includes an upstanding flange 15, that extends around the perimeter of the adapter, and is designed for embracing therein the bottom end of a decanter, arranged thereabove when stacked, such as the decanter 1 as shown in FIG. 1. The flange includes a series of slots, as at 16, which allows for some ventilation to extend through the upper edge of the adapter, when too much condensation forms therein, such as when freshly brewed beverage may be contained within the decanter 2, therebelow, and another freshly brewed beverage, perhaps of a different flavor or kind, has been brewed into and is provided within the decanter 1, arranged there above.

In addition, a downwardly extending rib 17 is integrally formed and depends approximate the outer perimeter lower edge of the plate 8. This particular rib is designed for embracing externally of the upper edge of the decanter, such as 2, upon which the adapter fits.

Figure 4:
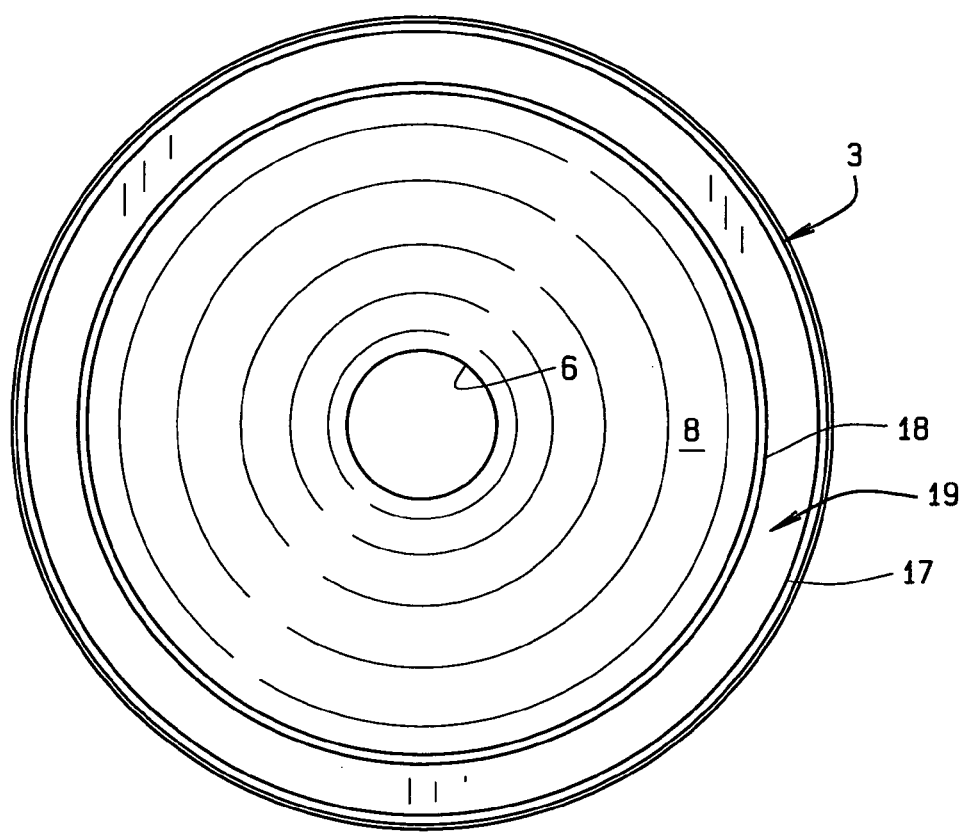
FIG. 4 is a bottom plan view of the adapter of FIG. 2.
Figure 7:
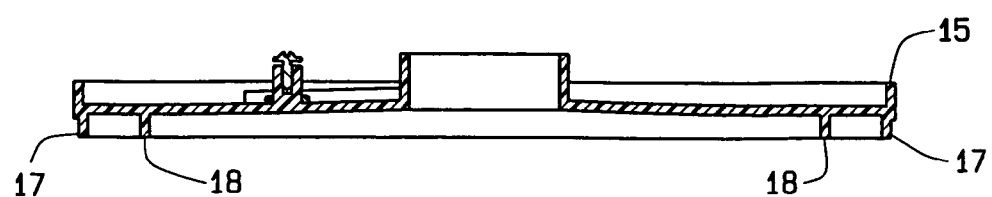
FIG. 7 is a sectional view taken along the line 7—7 of FIG. 3, providing a cross sectional view of the formed adapter.

As can also be seen in FIG. 4, an inner rib 18 extends downwardly, integrally, also from the bottom surface of the plate 8. Thus, the two ribs, 17 and 18, in their dependency, form an annular space 19 therearound, and into which the upper edge of the decanter arranged therebelow fits, when the adapter is seated upon a lower decanter, during usage. The adapter is used, as previously explained, to provide for stacking of one or more decanters on top of each other, or, in addition, the cap 13 may be closed for sealing off the aperture 7, to also function as a lid, for the brewed beverage within the decanter arranged therebelow, during application.

The concept of this invention is to facilitate, as previously explained, the application and stacking of a series of decanters one upon the other, each of which may hold its own discrete brewed beverage, or other beverage, for dispensing, as from their spigots 4 or 5, a number of such decanters can be stacked one upon the other, to substantial height, only utilizing the space equivalent to the diametric proportions of the lower most decanter, on a counter shelf, during usage and application.

Variations or modifications to the subject matter of this invention may occur to those skilled in the art upon reviewing the summary of the invention as defined herein, and upon undertaking a study of the description of its preferred embodiment. Such variations, if within the spirit of this development, are intended to be encompassed within the scope of the invention as shown and described herein. The specific depiction of the invention, as described, and as shown in the drawings, is set forth for illustrative purposes only.

The invention claimed is:

1. A loose fitting adapter to close and to separate one or more beverage decanters stacked vertically, one upon the other, comprising:

said adapter incorporating a plate, said plate having upper and lower surfaces, said plate having a continuous planar configuration throughout its extent, the upper surface of the plate including an upper flange to embrace and hold a decanter in place when stacked, the lower surface including a lower flange to embrace and retain the lower decanter in place, the plate having at least one aperture provided therethrough, a loose fitting cap useful for covering said aperture, said cap being secured to the upper surface of the plate, whereby when one of said adapters is placed upon a lower decanter, it closes the top of said decanter, and permits stacking of the upper decanter thereon, to provide a series of vertically erect and aligned decanters for dispensing of discrete beverages, said lower surface of said plate including an integral rib, said rib provided inwardly of the lower flange of the adapter, so as to provide for emplacement and locating of the adapter upon the lower decanter when stacked, said lower flange of the plate and said rib provided upon the lower surface of the plate provided approximate the outer circumference of said plate, with the rib being arranged inwardly disposed with respect to the lower flange of said adapter, said upper surface flange being circumferentially arranged around the outer perimeter of the plate, and said upper flange and lower flange extending in opposite directions from the upper and lower surfaces of said plate, said aperture of the plate having a cylindrical sleeve integrally extending upwardly from the upper surface, and arranged centrally thereof, and wherein said cap securing means comprising a mechanical connector fastened to a boss extending upwardly from the upper surface of the plate, and said cap arranged for loose seating onto the cylindrical sleeve of said adapter to provide closure for the said adapter.

2. The adapter of claim 1 and further comprising:
    said upper flange having slots provided therethrough for permitting ventilation between the stacked decanters.

3. The adapter of claim 1 wherein said lower surface of the plate has a concave shape inward of said rib with a nadir of the concave shape concentric with said arranged aperture, and said aperture being arranged centrally.

4. The adapter of claim 1 wherein said upper surface of the plate having said upper flange provided at the perimeter of said upper surface and arranged slightly further outwardly than the lower flange depending from the lower surface of the plate, thereby providing seating of an upper decanter upon a decanter arranged beneath said adapter;
    said upper flange having one or more spaced slots provided therethrough; and
    said aperture having said cylindrical sleeve extending upwardly from the upper surface, and arranged centrally thereof.

* * * * *